US011279844B2

(12) United States Patent
Oto et al.

(10) Patent No.: US 11,279,844 B2
(45) Date of Patent: Mar. 22, 2022

(54) COATING SOLUTION FOR GAS BARRIER, GAS BARRIER LAMINATE, PACKAGING MATERIAL AND PACKAGING MATERIAL FOR HEAT STERILIZATION

(71) Applicant: TOPPAN PRINTING CO., LTD., Tokyo (JP)

(72) Inventors: Chisato Oto, Tokyo (JP); Katsumi Kawaguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 44 days.

(21) Appl. No.: 16/708,041

(22) Filed: Dec. 9, 2019

(65) Prior Publication Data
US 2020/0109307 A1 Apr. 9, 2020

Related U.S. Application Data

(63) Continuation of application No. 14/705,734, filed on May 6, 2015, now abandoned, which is a continuation of application No. PCT/JP2013/079719, filed on Nov. 1, 2013.

(30) Foreign Application Priority Data

Nov. 7, 2012 (JP) ................. 2012-245307

(51) Int. Cl.
| C09D 133/02 | (2006.01) |
| C08K 3/22 | (2006.01) |
| C08K 3/26 | (2006.01) |
| C09D 201/08 | (2006.01) |
| C09D 5/00 | (2006.01) |
| C09D 7/61 | (2018.01) |
| C09D 7/40 | (2018.01) |
| C08J 7/04 | (2020.01) |
| C08J 7/043 | (2020.01) |
| C08J 7/048 | (2020.01) |
| B65D 81/24 | (2006.01) |

(52) U.S. Cl.
CPC ........... *C09D 133/02* (2013.01); *B65D 81/24* (2013.01); *C08J 7/043* (2020.01); *C08J 7/048* (2020.01); *C08J 7/0427* (2020.01); *C09D 5/00* (2013.01); *C09D 7/61* (2018.01); *C09D 7/67* (2018.01); *C09D 7/68* (2018.01); *C09D 201/08* (2013.01); *C08K 3/22* (2013.01); *C08K 3/26* (2013.01); *C08K 2003/222* (2013.01); *C08K 2003/2206* (2013.01); *C08K 2003/2217* (2013.01); *C08K 2003/2224* (2013.01); *C08K 2003/2296* (2013.01); *C08K 2003/265* (2013.01); *C08K 2003/267* (2013.01)

(58) Field of Classification Search
CPC ...... C09D 133/02; C09D 201/08; C09D 5/00; C08J 7/048; C08K 2003/2217; C08K 2003/267; C08K 2003/265; C08K 2003/2206; C08K 2003/222; C08K 2003/2224; C08K 2003/2296; C08K 3/26; C08K 3/22
See application file for complete search history.

(56) References Cited

U.S. PATENT DOCUMENTS

| 5,981,029 | A | * | 11/1999 | Harada | ..................... C08J 7/046 428/143 |
| 6,835,269 | B1 | | 12/2004 | Miharu et al. | |
| 7,501,176 | B2 | | 3/2009 | Yamasaki et al. | |
| 2003/0104211 | A1 | * | 6/2003 | Masuda | .............. C23C 18/1233 428/411.1 |
| 2005/0131162 | A1 | | 6/2005 | Tanaka et al. | |
| 2007/0111005 | A1 | | 5/2007 | Oshita et al. | |
| 2007/0134507 | A1 | * | 6/2007 | Yamasaki | ................... C08J 5/18 428/500 |
| 2009/0022981 | A1 | | 1/2009 | Yoshida et al. | |
| 2009/0171003 | A1 | * | 7/2009 | Nishiura | ................. B32B 27/08 524/503 |
| 2010/0015431 | A1 | | 1/2010 | Matsui et al. | |

FOREIGN PATENT DOCUMENTS

| CN | 1871287 A | 11/2006 |
| EP | 0 962 486 A2 | 12/1999 |
| EP | 1 178 075 A1 | 2/2002 |
| EP | 1 683 825 A1 | 7/2006 |
| JP | H06-009133 A | 1/1994 |
| JP | H06-16414 A | 1/1994 |
| JP | 08-176316 A | 7/1996 |
| JP | 2000-289154 A | 10/2000 |
| JP | 2000-336195 A | 12/2000 |
| JP | 2001-323204 A | 11/2001 |
| JP | 2002-020677 A | 1/2002 |

(Continued)

OTHER PUBLICATIONS

International Search Report dated Feb. 4, 2014 issued in Application No. PCT/JP2013/079719.
Extended European Search Report issued in Application No. 13852969.8 dated Feb. 19, 2016.
Office Action issued in Japanese Patent Application No. 2012-245307 dated Jul. 26, 2016.
First Office Action issued in Chinese Patent Application No. 201380058063.6 dated Aug. 18, 2016.

*Primary Examiner* — Karuna P Reddy
(74) *Attorney, Agent, or Firm* — Foley & Lardner LLP

(57) ABSTRACT

This coating solution for a gas barrier contains an ammonium salt (A) of a polymer having a carboxyl group, a particulate multivalent metallic compound (B), and water, the content of the multivalent metallic compound (B) being about 0.5-2.0 times the chemical equivalent of the ammonium salt (A), and the mean particle diameter of the multivalent metallic compound (B) being about 4 μm or less.

10 Claims, No Drawings

(56) References Cited

FOREIGN PATENT DOCUMENTS

| | | | |
|---|---|---|---|
| JP | 2002-241671 | A | 8/2002 |
| JP | 2003-292713 | A | 10/2003 |
| JP | 2005-125693 | A | 5/2005 |
| JP | 2005-126528 | A | 5/2005 |
| JP | 2007-136984 | A | 6/2007 |
| WO | WO-03/091317 | A1 | 11/2003 |
| WO | WO-2005/037898 | A1 | 4/2005 |
| WO | WO-2005/053954 | A1 | 6/2005 |

* cited by examiner

COATING SOLUTION FOR GAS BARRIER, GAS BARRIER LAMINATE, PACKAGING MATERIAL AND PACKAGING MATERIAL FOR HEAT STERILIZATION

CROSS-REFERENCE TO RELATED PATENT APPLICATIONS

This application is a Continuation of U.S. patent application Ser. No. 14/705,734, filed on May 6, 2015, which is a Bypass Continuation of International Patent Application No. PCT/JP2013/079719, filed on Nov. 1, 2013, which is based upon and claims the benefit of priority of Japanese Patent Application No. 2012-245307 filed on Nov. 7, 2012. The entire contents of which are hereby incorporated by reference in their entireties.

BACKGROUND

The present invention relates to a coating solution for gas barrier, a gas barrier laminate having a gas barrier layer formed using the aforementioned coating solution for gas barrier, a packaging material including the aforementioned gas barrier laminate and a packaging material for heat sterilization.

If foods, drugs, cosmetics, agrichemicals, industrial products and the like are preserved for a long time, their qualities are sometimes deteriorated because of oxygen. Accordingly, as packaging materials for these goods, there has been used film or sheets having oxygen gas barrier properties.

As the packaging materials, conventionally, materials including an aluminum foil as a gas barrier layer are often used. However, if the packaging material including an aluminum foil is used, the contents cannot be seen, and a metal detector cannot be used. Accordingly, especially in the food field and drug medicine field, there has been a need for development of a highly gas-impermeable and transparent packaging material.

For this need, there has been suggested and used a gas barrier laminate in which a layer made of polyvinylidene chloride (PVDC) is provided by applying a coating solution containing PVDC. The layer made of PVDC is transparent and gas-impermeable.

However, PVDC has a concern of generating dioxin during incineration. Accordingly, a change from PVDC to non-chlorine material has been advanced, for example, using polyvinylacohol (PVA)-based polymer in place of PVDC has been suggested.

A layer made of a PVA-based polymer is dense because of hydrogen bonds of hydroxyl groups, and shows high gas barrier properties under a low-humidity atmosphere. However, layers made of PVA-based polymers have a problem that, under a high-humidity atmosphere, the gas barrier properties are significantly lower, because hydrogen bonds loosen because of moisture absorption.

Accordingly, gas barrier laminates using layers made of PVA-based polymers as gas barrier layers cannot be used in packaging material for foods and the like containing much moisture in many cases, and so their use has been limited to packaging material for dry substances, and the like.

For the sake of improving gas barrier properties under a high-humidity atmosphere, a method for adding inorganic lamellar compounds to PVA-based polymers has been suggested (see JP-A-No.H06-093133). However, also in the method of JP-A-No. H06-09133, because waterproofness of the PVA-based polymer itself is not improved, the problem of lowering of gas barrier properties under a high-humidity atmosphere has remained.

In order to improve gas barrier properties under a high humidity atmosphere, there has been suggested a method for producing a gas barrier laminate by applying a coating solution containing a PVA-based polymer and a polymer which can form a cross-link structure with the PVA-based polymer on a substrate and by performing a heat treatment (see JP-A-2000-289154; JP-A-2000-336195; JP-A-2001-323204; JP-A-2002-020677; JP-A-2002-241671).

However, in this method, for obtaining sufficient gas barrier properties, the heat treatment after applying the coating solution needs to be performed at a high temperature, for example, above 150° C. to form the cross-link structure. Depending on the materials of the substrate, for example, when the material of the substrate is a polyolefin such as polypropylene (OPP) or polyethylene (PE), the heat treatment causes significant damage to the substrate. Accordingly, there is a need for a gas barrier laminate which can be produced under milder conditions.

As the method for forming the gas barrier layer, there has been also suggested a method where a layer containing polycarbonate-based polymer such as polyacrylic acid is formed and the above-described polycarbonate-based polymer is ion-crosslinked with multivalent metallic ions (see WO2003/091317; WO2005/053954).

This method does not need the heat treatment at a high temperature as in the methods described in JP-A-2000-289154; JP-A-2000-336195; JP-A-2001-323204; JP-A-2002-020677; JP-A-2002-241671.

Accordingly, polyolefin can be used as the substrate. The obtained gas barrier layer is highly gas-impermeable even under a high humidity atmosphere, and can be used for uses where it is subjected to a heat sterilization treatment such as boiling or a retort.

However, if polycarbonate-based polymer and a multivalent metallic compound are formulated into the same coating solution, especially when water is used as a solvent, then polycarbonate-based polymer and the multivalent metallic compound react with each other in the coating solution, which is likely to cause a precipitate. Accordingly, in this method, when the gas barrier layer is formed, a layer containing the polycarbonate-based polymer and a layer containing the multivalent metallic compound are formed separately, or an aqueous solution of a multivalent metal salt is contacted with the layer containing the polycarbonate-based polymer. However, in this case, there is a problem of increase in the number of steps.

SUMMARY OF THE INVENTION

The present invention has been made under the above-described circumstances and has an object to provide a coating solution for gas barrier by which a gas barrier laminate highly gas-impermeable under a high-humidity atmosphere can be prepared readily, a gas barrier laminate which can be obtained using the aforementioned coating solution for gas barrier, a packaging material including the aforementioned gas barrier laminate, and a packaging material for heat sterilization.

The present invention for solving the above-described problem includes the following aspects.

A coating solution for gas barrier according to the first aspect of the present invention contains an ammonium salt (A) of a polymer including a carboxyl group, a particulate multivalent metallic compound (B) and water, wherein the multivalent metallic compound (B) content is about 0.5 to 2.0 times the chemical equivalent of the ammonium salt (A), and mean particle size of the multivalent metallic compound (B) is about 4 μm or less.

In the coating solution for gas barrier according to the first aspect of the present invention, the multivalent metallic compound (B) may be at least one selected from an oxide, hydroxide and carbonate of a multivalent metal selected from zinc, magnesium and calcium.

In the coating solution for gas barrier according to the first aspect of the present invention, the multivalent metallic compound (B) may be at least one type selected from zinc oxide and magnesium oxide.

In the coating solution for gas barrier according to the first aspect of the present invention, the polymer including a carboxyl group may be at least one type selected from a homopolymer and copolymer of monomer selected from acrylic acid, methacrylic acid, maleic acid and itaconic acid.

A gas barrier laminate according to the second aspect of the present invention includes a substrate and a gas barrier layer provided on at least one surface of the substrate, wherein the gas barrier layer may include a coat layer formed from the coating solution for gas barrier according to the above first aspect.

A packaging material according to the third aspect of the present invention may include the gas barrier laminate according to the above second aspect.

A packaging material for heat sterilization according to a fourth aspect of the present invention may include the gas barrier laminate according to the above second aspect.

The above-described aspect of the present invention can provide a coating solution for gas barrier by which a gas barrier laminate highly gas-impermeable under a high-humidity atmosphere can be prepared readily, a gas barrier laminate which can be obtained using the aforementioned coating solution for gas barrier, a packaging material including the aforementioned gas barrier laminate, and a packaging material for heat sterilization.

DETAILED DESCRIPTION

<Coating Solution for Gas Barrier>

A gas barrier coating solution (also referred to simply as coating solution, below) according to a first embodiment of the present invention is characterized in that the coating solution contains an ammonium salt (A) (also referred to as constituent (A), below) of a polymer (also referred to as polymer containing a carboxyl group, below) including a carboxyl group, a particulate multivalent metallic compound (B) (also referred to as constituent (B), below) and water, the multivalent metallic compound (B) content is about 0.5 to about 2.0 times the chemical equivalent of the ammonium salt (A), and mean particle size of the multivalent metallic compound (B) is about 4 μm or less.

[Constituent (A)]

The constituent (A) is the ammonium salt of the polymer containing a carboxyl group.

It is preferred that the polymer containing a carboxyl group is a polymer which has, in a molecule of the polymer, two or more building blocks each containing at least one carboxyl group.

The polymers containing a carboxyl group can include, for example, a polymer of an unsaturated carboxylic acid having an ethylenic double bond in the molecule; a copolymer of the aforementioned unsaturated carboxylic acid and another monomer; and acid polysaccharides having a carboxyl group in the molecule, such as alginic acid, carboxymethyl cellulose and pectin.

The aforementioned unsaturated carboxylic acids can include acrylic acid, methacrylic acid, maleic acid, itaconic acid, fumaric acid and crotonic acid.

Unsaturated monomers capable of copolymerizing with the aforementioned unsaturated carboxylic acid are preferred to be unsaturated monomers having an ethylenic double bond in the molecule, and can include, for example, olefins (ethylene, propylene, etc.), vinyl saturated carboxylate esters (vinyl acetate, etc.), alkyl unsaturated carboxylate esters (alkyl acrylate, alkyl methacrylate, alkyl itaconate, etc.), vinyl chloride, vinylidene chloride, styrene, acrylamide, acrylonitrile, and the like.

The polymers of unsaturated carboxylic acid may be homopolymers or copolymers where two or more types of unsaturated carboxylic acids are copolymerized.

The unsaturated carboxylic acid and the other monomer used for copolymers of the unsaturated carboxylic acid and the other monomer may be one, two or more types, respectively.

The polymer containing a carboxyl group is preferred to be a polymer of an unsaturated carboxylic acid in view of gas barrier properties of a formed coat layer, transparency and so on, and further preferred to be at least one type selected from homopolymers and copolymers of monomers selected from acrylic acid, methacrylic acid, maleic acid, and itaconic acid, especially preferred to be at least one type selected from homopolymers and copolymers of monomers selected from acrylic acid and methacrylic acid.

The weight-average molecular weight of the polymer containing a carboxyl group (in a state where it is not neutralized with ammonia) is preferred to be within a range of 2,000 to 10,000,000, and further preferred to be within a range of 5,000 to 1,000,000. If the weight-average molecular weight is 2,000 or more, the formed coat layer has good flexibility and waterproofness. If the weight-average molecular weight is 10,000,000 or less, the viscosity of raw materials is low enough to bring ease of handling. Further, because the viscosity of the coating solution thereof is also low enough, the constituent (B) is unlikely to aggregate and a coating solution where the constituent (B) is uniformly dispersed can readily be obtained.

It should be noted that the above-described weight-average molecular weight is a weight-average molecular weight in terms of polystyrene which is measured by gel permeation chromatography (GPC).

The constituent (A) is obtained by neutralizing the polymer containing a carboxyl group with ammonia (water). It can also be obtained by polymerizing an ammonium salt of the aforementioned unsaturated carboxylic acid.

Regarding the constituent (A), the pH when the constituent (A) is dissolved in water to prepare an aqueous solution of concentration of 10 mass % is preferred to be within a range of 7.0 to 9.0, and further preferred to be within a range of 7.5 to 8.5. If the pH is under 7.0, cross-links links might be formed between the carboxyl group which has not been neutralized with ammonia yet and a multivalent metallic ion, which might result in occurrence of aggregation in the coating solution. If the pH is over 9.0, ammonia odor increases, or excessive energy is needed for removing ammonia when the coating layer is formed. The pH is a value obtained at 25° C.

As the constituent (A), one type may be used singularly, or two or more types may be used in combination.

The constituent (A) content in the coating solution according to the first embodiment of the present invention is preferred to be 1 to 15 mass %, and further preferred to be 1.5 mass % to 10 mass %, relative to the gross mass of the coating solution.

If the constituent (A) content is 1 mass % or more, a coating layer having sufficient thickness is formed, which eliminates the need to apply much coating solution. Accordingly, a uniform layer can be formed readily. If the constituent (A) content is 15 mass % or less, the viscosity of the coating solution is low enough, the constituent (B) is unlikely to aggregate excessively, and the coating solution where the constituent (B) is uniformly dispersed can be obtained readily.

[Constituent (B)]

The constituent (B) is the particulate multivalent metallic compound.

In the present invention, that the multivalent metallic compound is particulate means a state where shapes of particles of solid having a size detectable by a laser diffraction and scattering method are kept in the coating solution. The particles may be primary particles or aggregated particles where primary particles gather. The size of particles is represented as the mean particle size.

The multivalent metallic compound is a compound of metal (multivalent metal) where the valence of the metallic ion is two or more.

Examples of the multivalent metal can include alkali earth metals such as magnesium and calcium, transition metals such as titanium, zirconium, chrome, manganese, iron, nickel, copper and zinc, aluminum, and the like.

Examples of the multivalent metallic compounds can include, for example, an oxide, hydroxide, or carbonate of the aforementioned multivalent metal, and the like.

In order to exist having a particular shape in the coating solution containing water, the multivalent metallic compound is preferred to have low solubility in water, for example, one whose solubility is 5.0 g or less at 25° C. in 1 L of water is preferred.

The constituent (B) is preferred to be a multivalent metallic compound made of at least one type selected from an oxide, hydroxide and carbonate of the multivalent metal selected from zinc, magnesium and calcium in view of low solubility, gas barrier properties, stability of the coating solution, and the like, and especially preferred to be one made of at least one type selected from zinc oxide and magnesium oxide.

The mean particle size of the constituent (B) in the coating solution is about 4 μm or less, preferably about 3 μm or less, more preferably about 2 μm or less, and especially about 1 μm or less is preferable. If the mean particle size of the constituent (B) is about 4 μm or less, stability of the coating solution, gas barrier properties of the formed coat layer, transparency, and the like are improved.

The lower limit of the mean particle size of the constituent (B) is not limited especially in view of the above-described effects, but 50 nm or more is preferred, 100 nm or more is further preferred, and 150 nm or more is especially preferred.

If the mean particle size is 50 nm or more, it is useful when the gas barrier laminate obtained using this coating solution is used for packaging materials for heat sterilization. If the mean particle size is comparatively large, cross-linking of the carboxyl group and the multivalent metallic ion is slowly formed, which keeps the cross-link formation rate low before any heat sterilization process such as a retort treatment. Accordingly, abuse resistance is good, cracking of the coat layer is prevented even if the gas barrier laminate is subjected to abuse such as folding or bending before the heat sterilization. Further, since the cross-link formation is further progressed by the following heat sterilization, sufficient barrier properties can finally be obtained.

The mean particle size of the constituent (B) is a median size (D50) measured by a laser diffraction and scattering method. The detailed measurement method is as shown in Examples described below.

The mean particle size of the constituent (B) can be regulated by the primary particle size of the multivalent metallic compound, a dispersion process in preparing the coating solution, and the like. The coating solution can be prepared by mixing raw materials such as the constituent (A), the constituent (B) and water, followed by performing the dispersion process as needed. In many case, the constituent (B) contained in the liquid before the dispersion process is an aggregated particle where a plurality of primary particles made of the multivalent metallic compound gather. Accordingly, the mean particle size of the constituent (B) can be reduced by performing the dispersion process. The mean particle size of the constituent (B) approaches the primary particle size, as the dispersion process is carried out under more severe conditions. The dispersion process is described below in detail.

The shape of the primary particle of the multivalent metallic compound may be a plate-like shape and a needle-like shape in addition to a spherical shape, depending on the shapes of the crystal of the multivalent metallic compounds. Any shape can be used as the constituent (B).

The primary particle size of the multivalent metallic compound is not limited especially as long as the mean particle size in the coating solution is within a range of about 4 μm or less. However, the primary particle size is preferred to be 1 μm or less, further preferred to be 100 nm or less. The primary particle size is obtained by observing the particles with a scanning electron microscope or a transmission electron microscope, followed by measuring the unidirectional particle diameter from the obtained image. Regarding multivalent metallic compounds having a plate-like shape or a needle-like shape, the length of the longest side is defined as the primary particle size.

As the constituent (B), one type may be used singularly, or two or more types may be used in combination.

The constituent (B) content in the coating solution according to the first embodiment of the present invention is about 0.5 to 2.0 times the chemical equivalent of the constituent (A), and preferred to be about 0.7 to 1.5 times. If the constituent (B) content is under about 0.5 times, since there are not enough multivalent metallic ions to cross-link the carboxyl group, the waterproofness of the coat layer becomes insufficient, which might cause the gas barrier properties to lower under a high-humidity atmosphere. Further, since the heat-resistance also becomes insufficient, the gas barrier properties might lower during heat sterilization such as retort treatment and boiling treatment. On the other hand, if the constituent (B) content is over about 2.0 times, in the coat layer, excessive multivalent metallic compound which does not participate in formation of the cross-link structure inhibits formation of a dense structure. Accordingly, sufficient gas barrier properties cannot be obtained, and transparency might be deteriorated.

Here, the chemical equivalent represents an amount depending on the carboxyl groups in the constituent (A) and the valence of the multivalent metal in the constituent (B). For example, the amount of the constituent (B) which satisfies that [the number of the carboxyl groups of the constituent (A) contained in the coating solution=the number of the multivalent metal in the constituent (B)*valence] is 1.0 times (1.0 eq) the chemical equivalent of the constituent (A).

An example of a case where polyacrylic acid ammonium salt as the constituent (A) and zinc oxide as the constituent (B) are used is described. The molecular weight of monomer (ammonium acrylate) of the polyacrylic acid ammonium salt is 89, and a molecule of the monomer has one carboxyl group. The zinc of zinc oxide is divalent, and cross-linking is formed in a ratio of 2 carboxyl groups to 1 zinc ion. A state where all carboxyl groups of polyacrylic acid ammonium salt can cross-link with zinc ions is a state where 1 eq of zinc oxide is added to ammonium salt of polyacrylic acid. For example, if 100 g of polyacrylic acid ammonium salt is prepared, the amount of carboxyl groups therein is 1.12 mol. When 1 eq of zinc oxide is added to this, an amount for cross-linking all of the 1.12 mol of carboxyl groups in the polyacrylic acid ammonium salt is necessary. Since zinc is divalent, the amount of zinc oxide is half of 1.12 mol, i.e. 0.56 mol (45.6 g).

[Water]

The coating solution according to the first embodiment of the present invention contains water.

The water is used as a solvent of the constituent (A) and a dispersion medium of the constituent (B).

Types of the water used in the coating solution are not limited especially, but can include distilled water, ion-exchange water, ultrapure water, tap water and the like.

[Organic Solvent]

The coating solution according to the first embodiment of the present invention may contain only water as the solvent of the constituent (A) and the dispersion medium of the constituent (B). However it may further contain an organic solvent in order to improve coatability of the coating solution or the appearance after drying.

The organic solvent only has to form a uniform solution without phase-separating when it is mixed with water, and can include alcohols such as methanol, ethanol and 2-propanol.

When an organic solvent is used, the content thereof only has to be within a range where the stability of the coating solution is not deteriorated. For example, if an alcohol is used as the organic solvent, the alcohol content is ordinarily preferred to be 40 mass % or less in alcohol ratio relative to the sum of the water and alcohol.

[Optional Constituent]

The coating solution according to the first embodiment of the present invention may further contain other constituents aside from the constituent (A) and the constituent (B), as long as the gas barrier properties of the formed gas barrier laminate and interlayer adhesiveness are not impaired.

As the other constituents, there can be used other polymers except for the constituent (A) or publicly known additives as additives of the coating solution. For example, in order to improve coatability to a substrate of the gas barrier laminate or other layers (ex. anchor coat layer) optionally formed on the substrate, a surface conditioner can be added. In order to further improve waterproofness of the coat layer, a metallic alkoxide can be added. Further, in order to improve flexibility, glycerin or polysaccharide can be added. For further improving gas barrier properties of the coat layer, a lamellar compound can also be added.

[pH]

The pH (25° C.) of the coating solution according to the first embodiment of the present invention is preferred to be within a range of 6.5 to 9.5, and further preferred to be within a range of 8.0 to 9.5. If the pH is 6.5 or more, the dispersion stability of the coating solution is good. If the pH is 9.5 or less, the gas barrier properties of the coat layer are good.

[Method for Preparing Coating Solution]

The coating solution can be prepared by mixing the raw materials such as the constituent (A), the constituent (B) and water, followed by performing the dispersion treatment as needed.

The dispersion treatment is carried out to make the mean particle size of the constituent (B) be a predetermined value. If the mean particle size of the constituent (B) in the mixed solution before the dispersion treatment is about 4 μm or less, the dispersion treatment may be omitted, but is preferred to be carried out in this case. Performing the dispersion treatment releases the aggregation, which stabilizes the coating solution and increases transparency of the gas barrier laminate obtained by applying the coating solution. Further, when the coating solution is applied and dried, the cross-link formation of the polymer containing carboxyl groups and the multivalent metallic ions is likely to progress, and a gas barrier laminate having good gas barrier properties is likely to be obtained.

The methods of the dispersion treatment can include methods using a high-speed agitator, a homogenizer, a ball mill or a bead mill. Especially, if the dispersion is performed using a ball mill or a bead mill, a coating solution having dispersion stability can be obtained with high dispersion efficiency in a comparatively short time. In this case, the ball or the bead having a small diameter is better, 0.2 to 1 mm is preferred.

[Functions and Effects]

In the present invention, a polymer containing a carboxyl group is formulated in a form of an ammonium salt. In the present invention, as a multivalent metallic compound, a particulate multivalent compound, i.e. a multivalent metallic compound which has low solubility in water and can exist keeping the particulate shape in the coating solution containing water, is formulated. This can prevent the polymer containing a carboxyl group from being ion-crosslinked by the multivalent metallic ion during preparing the coating solution or in the coating solution after the preparation. That is, by protecting the carboxyl group in the polymer containing a carboxyl group by the ammonium ion, the carboxyl group is prevented from reacting with the multivalent metallic compound and being ion-crosslinked with the multivalent metallic ion. This can prevent generation of aggregations due to the reaction, and can make solution stability and coatability of the coating solution, transparency and thickness uniformity of the formed coat layer, and the like become good.

The ammonium ion in the coating solution can be vaporized as ammonia. Accordingly, if the coating solution according to the first embodiment of the present invention is applied on the substrate by coating and drying treatment is performed for removing water and the like from the formed coating film, the ammonium ion protecting the carboxyl group can also be removed. Thereby, the carboxyl group in the polymer containing a carboxyl group is exposed, reacts with the multivalent metallic compound, and is ion-crosslinked by the multivalent metallic ion. Accordingly, the coat layer formed by drying the coating film contains the polymer containing a carboxyl group ion-crosslinked by the multivalent metallic ion.

The coat layer has high waterproofness, and shows excellent gas barrier properties even under a high-humidity environment.

Although described in detail below, the aforementioned coat layer also has excellent heat-resistance, abuse resistance and the like.

Further, according to the coating solution based on the first embodiment of the present invention, the coat layer described above can be formed on the substrate only by coating and drying once, drying can also be performed at a low temperature at about 40 to 150° C. Therefore, a substrate having poor heat-resistance can be used, and types of the substrates are not limited. Further, the gas barrier laminate can industrially be produced readily.

[Gas Barrier Laminate]

A gas barrier laminate according to a second embodiment of the present invention is characterized by including a substrate and a gas barrier layer provided on at least one surface of the substrate, wherein the gas barrier layer includes a coat layer formed from the coating solution according to the first embodiment of the present invention.

[Substrate]

The substrate of the gas barrier laminate according to the second embodiment of the present invention is not limited especially, and various types can be used.

The materials forming the substrates are not limited especially, but various types can be used, for example, the materials can include plastics, paper, and the like.

The substrate may be a substrate of a single layer made of a single material, or may be a substrate of multi-layer made of multiple materials. For example, an example of the substrate of multi-layer includes a substrate where a film made of a plastic is laminated on a paper.

Of these, the material forming the substrate is preferred to be a plastic, because it can be formed into various shapes and use thereof is further developed by giving gas barrier properties.

The plastics are not limited especially, for example, include polyolefin resins such as polyethylene and polypropylene, polyester-based resins such as polyethylene terephthalate, polyethylene-2,6-naphthalate, polybutylene terephthalate and copolymers thereof, polyamide-based resins such as nylon-6, nylon-66, nylon-12, meta-xylylene adipamide and copolymers thereof, styrene-based resins such as polystyrene, styrene-butadiene copolymer and styrene-butadiene-acrylonitrile copolymer, poly(meth)acrylate ester, polyacrylonitrile, polyvinyl acetate, ethylene-vinyl acetate copolymer, ethylene-vinyl alcohol copolymer, polycarbonate, polyarylate, regenerated cellulose, polyimide, polyether imide, polysulfone, polyether sulfone, polyether ketone, ionomer resin and the like.

If the gas barrier laminate is used in food packaging materials, of the above, the substrate is preferred to be made of polyethylene, polypropylene, polyethylene terephthalate, nylon-6 or nylon-66.

The plastic forming the substrate is one type singularly or a blend of two or more types.

Additives may be formulated into the plastic. Additives can properly be selected from publicly known additives such as a pigment, an oxidation inhibitor, an antistatic agent, an ultraviolet absorbing agent and a lubricant, depending on use.

As the additive, one type may be used singularly, or two or more types may be used in combination.

The forms of the substrates are not limited especially, for example, and can include a film, a sheet, a cup, a tray, a tube, a bottle and the like. Of these, a film is preferred.

If the substrate is a film, the film may be a stretched film, or may be an unstretched film.

Although the thickness of the film is not limited especially, in view of mechanical strength of the obtained gas barrier laminate and processing suitability, it is preferred to be 1 to 200 μm, and further preferred to be 5 to 100 μm.

The surface of the substrate may be subjected to a plasma treatment, a corona treatment, an ozone treatment, a flame treatment, a radical activation treatment with UV or electron beams, and the like such that the coating solution can be applied on the substrate without cissing. The treatment method is chosen properly, depending on types of the substrates.

[Coat Layer]

The coat layer is formed from the coating solution according to the first embodiment of the present invention. Specifically, the coat layer is prepared by applying the coating solution according to the first embodiment of the present invention on the substrate by coating, followed by drying. The coat layer, as described above, contains the polymer containing carboxyl groups ion-crosslinked by the multivalent metallic ions, and shows excellent gas barrier properties even under a high-humidity atmosphere.

The coat layer may be provided on one side of the substrate, or the coat layers may be provided on both surfaces.

The coat layer may be provided directly on the surface of the substrate, or may be provided on a surface of another layer (ex. an anchor layer) formed on the substrate.

The method for forming the coat layer is described in detail below.

The thickness of the coat layer is preferably about 0.01 to 5 μm, more preferably about 0.05 to 2 μm, further more preferably about 0.05 to 1 μm, especially preferably about 0.1 to 0.5 μm.

If the thickness of the coat layer is about 0.01 μm or more, sufficient gas barrier properties can be obtained.

If the thickness of the coat layer is about 5 μm or less, a uniform coat layer can be formed readily in manufacturing, and a coat layer having no defects can be obtained readily. Abuse resistance becomes more excellent, as the thickness of the coat layer is thinner.

The reason is that, when the laminate having a thick coat layer is subjected to abuse such as folding or bending, the coat layer cannot endure the stress, which is likely to cause a defect such as cracking. The stress is dispersed by making the coat layer thinner, thereby defects can be suppressed. Further, change in dimension of the gas barrier laminate is less likely to occur in a process such as printing or laminating, as the thickness of the coat layer is thinner.

Abuse resistance of the gas barrier laminate becomes a problem when the substrate is such as a film and abuse causes deformation thereof. However, if the substrate is thick and hard, there is no need for considering abuse resistance of the gas barrier laminate.

[Other Layers]

The gas barrier laminate according to the second embodiment of the present invention may include other layers apart from the substrate and the aforementioned coat layer, as needed.

For example, the gas barrier layer included in the gas barrier laminate according to the second embodiment of the present invention may be only the aforementioned coat layer. However, as the other gas barrier layers other than the aforementioned coat layer, a layer made of an inorganic compound such as aluminum oxide, silicon oxide and aluminum may be formed on the surface of the substrate by a sputtering method, an ion plating method and the like.

The gas barrier laminate according to the second embodiment of the present invention may further include an anchor coat layer between the substrate and the coat layer for the sake of increasing adhesiveness between the substrate and the coat layer or enabling the coating solution to be applied without cissing by the substrate.

The anchor coat layer can be formed using publicly-known anchor coat agent by ordinary methods.

The anchor coat agents can include, for example, an anchor coat agent containing a resin such as polyurethane resin, acrylic resin, melamine resin, polyester resin, phenol resin, amino resin or fluorine resin. As the resins, aqueous polyester resin is preferred, because it has good coatability of the coating solution according to the first embodiment of the present invention. The word aqueous means that it can dissolve or be dispersed in water.

The anchor coat agent can further contain isocyanate compound aside from the resin for the sake of improving adhesiveness or hot-liquid resistance. The isocyanate compounds only has to have one or more isocyanate groups in a molecule, for example, can include hexamethylene diisocyanate, xylylene diisocyanate, isophorone diisocyanate, tolylene diisocyanate, and the like.

The anchor coat agent may further contain a liquid medium for dissolving and dispersing the resin or the isocyanate compound. As the liquid medium, water is preferred. An organic solvent such as isopropyl alcohol may be used in addition to water in order to improve coatability of the anchor coat agent.

The anchor coat agent is preferred to contain aqueous polyester resin and an isocyanate compound, in view of wettability of the coating solution and hot-liquid resistance.

The thickness of the anchor coat layer is not limited especially, its mass in a unit area is preferred to be 0.01 to 2.0 $g/m^2$, further preferred to be 0.05 to 1.0 $g/m^2$. If the mass in a unit area is 0.01 $g/m^2$ or more, sufficient effect due to provision of the anchor coat layer can be obtained. If the mass in a unit area is 2.0 $g/m^2$ or less, smoothness of the anchor coat layer becomes good, which enables the coat layer made of the coating solution according to the first embodiment of the present invention to be formed uniformly, thereby improving gas barrier properties.

The surface of the anchor coat layer is preferred to have high wet tension, because the coatability of the coating solution according to the first embodiment of the present invention is improved. The wet tension of the surface of the anchor coat layer is preferred to be 45.0 mN/m or more, further preferred to be 48.0 mN/m or more. The wet tension can be estimated using a commercially available mixed solution for a wet tension test.

The gas barrier laminate according to the second embodiment of the present invention, as needed, may include another layer layered by lamination through the adhesive agent or another layer layered by extrusion-lamination using an adhesive resin, on the coat layer provided on the substrate or on a side of the substrate which does not form the coat layer thereon.

The layered other layer can be chosen properly, depending on the object such as giving strength, giving sealing ability or ease of opening when sealing is applied, giving design properties, giving light-barrier properties and giving moisture-proofness, and is not limited especially. For example, a layer whose material is the same as the aforementioned plastics of the substrate can be given. Other than this, paper, aluminum foil and the like can be used.

The thickness of the layered other layer is preferably 1 to 1000 μm, more preferably 5 to 500 μm, further preferably 5 to 200 μm, especially preferably 5 to 150 μm.

The layered other layer may be one type or two or more types.

The gas barrier laminate according to the second embodiment of the present invention may further include a print layer, as needed. The print layer may be formed on the coat layer provided on the substrate, or may be formed on the side of the substrate where the coat layer is not provided. If another layer is layered, the print layer may be formed on the layered layer.

[Method for Producing Gas Barrier Laminate]

The gas barrier laminate according to the second embodiment of the preset invention can be produced by a producing method including steps where the coating solution according to the first embodiment of the present invention is applied on the substrate by coating and dried to form the coat layer. This producing method may further include, as needed, before or after a step for forming the coat layer, a step for layering another layer by lamination, a step for forming the print layer and the like. Alternatively, this producing method may further include, as needed, before and after a step for forming the coat layer, a step for layering another layer by lamination, a step for forming the print layer and the like.

The coating methods of the coating solution are not limited especially and, for example, can include a method for coating using an air-knife coater, a direct gravure coater, gravure offset, an arc gravure coater, an reverse roll coater such as a top-feed reverse coater, a bottom-feed reverse coater and a nozzle-feed reverse coater, a roll coater of five rolls, a lip coater, a bar coater, a bar reverse coater and a die coater.

Drying methods of the applied coating solution are not limited especially and, for example, can include a method for drying naturally, a method for drying in an oven set at a predetermined temperature, a method for using a drying machine attached to a coater such as an arch dryer, a floating dryer, a drum dryer and an infrared ray dryer.

Dry condition can be determined properly, depending on a drying method and the like. For example, in the method for drying in an oven, the drying temperature is preferably 40 to 150° C., more preferably 45 to 150° C., especially preferably 50 to 140° C. Drying time is preferably 0.5 seconds to ten minutes, more preferably one second to five minutes, especially preferably one second to one minute.

Regarding the gas barrier laminate according to the second embodiment of the present invention, oxygen permeability at a temperature of 30° C. and a relative humidity of 70% RH is preferably 100 $cm^3(STP)/m^2 \cdot day \cdot MPa$ or less, more preferably 80 $cm^3(STP)/m^2 \cdot day \cdot MPa$ or less, further preferably 50 $cm^3(STP)/m^2 \cdot day \cdot MPa$ or less. Lower oxygen permeability is preferred. Although the lower limit is not limited especially, ordinarily oxygen permeability is 0.1 $cm^3(STP)/m^2 \cdot day \cdot MPa$ or more.

[Function and Effects]

The gas barrier laminate according to the second embodiment of the present invention includes the coat layer formed using the coating solution according to the first embodiment of the present invention. The aforementioned coat layer, as described above, contains the polymer containing a carboxyl group ion-crosslinked with the multivalent metallic ion, and has excellent gas barrier properties even under a high-humidity atmosphere. For example, even if only the coat layer is included as a gas barrier layer, the above-described oxygen permeability can be achieved.

Accordingly, the gas barrier laminate according to the second embodiment of the present invention is useful as a packaging material for goods which are easily deteriorated because of the effects of oxygen, moisture and the like.

The gas barrier laminate according to the second embodiment of the present invention also has excellent heat resistance. For example, when the gas barrier laminate according to the second embodiment of the present invention is subjected to heat sterilization treatment such as boiling treatment and retort treatment, gas barrier properties are not deteriorated but tend to be improved. Interlayer adhesiveness also tends to be improved by performing heat sterilization treatment. Accordingly, the gas barrier laminate according to the second embodiment of the present invention has high usability as a packaging material for heat sterilization, i.e. a packaging material for goods which are subjected to heat sterilization after packaging the goods.

<Packaging Material>

A packaging material according to a third embodiment of the present invention includes the gas barrier laminate according to the second embodiment of the present invention.

The packaging material according to the third embodiment of the present invention may be a formed object. The formed objects can include, for example, a container, a member configuring a part of the container and the like, and specific examples can include a bag-like product, a spout pouch, a laminate tube, an infusion solution bag, a lid of a container, a paper container and the like.

The use to which the packaging material according to the third embodiment of the present invention is applied is not limited especially, and it can be used as a packaging material for various goods.

As described above, the gas barrier laminate according to the second embodiment of the present invention has excellent gas barrier properties. Accordingly, the packaging material according to the third embodiment of the present invention is preferably used as a packaging material for goods which are easily deteriorated because of effects such as of oxygen and moisture. Of these, it is preferably used as a packaging material for foods. Other than as a packaging material for foods, it can preferably be used as an industrial material such as for drugs such as agricultural chemicals and medicines, medical instruments, machine components and a precision material.

When the gas barrier laminate according to the second embodiment of the present invention is subjected to heat sterilization treatment such as boiling treatment and retort treatment, gas barrier properties and interlayer adhesiveness tend not to be deteriorated but to be improved. Accordingly, the packaging material according to the third embodiment of the present invention may be a packaging material for heat sterilization.

The packaging material for heat sterilization is used in a packaging for goods which is subjected to a heat sterilization treatment after packaging.

The goods which are subjected to heat sterilization treatment after packaging include, for example, foods such as curry, stew, soup, sauce and processed meat product.

The heat sterilization treatments can include boiling treatment, retort treatment and the like.

The boiling treatment is treatment where sterilization by moisture and heat is performed in order to preserve foods and the like. Ordinarily, while depending on contents, the gas barrier laminate packaging foods and the like is subjected to the moist-heat sterilization under conditions of at 60 to 100° C., under atmosphere pressure and for 10 to 120 minutes. The boiling treatments are ordinarily performed using a hot liquid bath, and include a batch type where it is immersed in the hot liquid bath at a constant temperature and taken from it after a given time and a continuous type where it passes through the hot liquid bath like through a tunnel.

The retort treatment is treatment where sterilization by pressurizing is performed to destroy fungi, yeast, bacteria and the like for preserving foods and the like. Ordinarily, the gas barrier laminate packaging foods is subjected to the sterilization by pressurizing under conditions of at 105 to 140° C., at 0.15 to 0.3 MPa and for 10 to 120 minutes. Retort machines include a steam type using steaming and a hot water type using pressurized hot water and the like, these are used properly depending on sterilization conditions of foods and the like which are the contents.

EXAMPLES

Hereinafter is described the present invention more closely. It should be noted that the present invention is not limited to Examples.

The measuring methods used in Examples and Comparative examples are described below.

(1) Mean Particle Size of the Constituent (B)

The mean particle size (μm) of the constituent (B) contained in the coating solution was measured according to the following procedure.

The obtained coating solution was diluted with water to regulate the concentration of the constituent (A) such as to become 0.01 mass %. The mean particle size of the dispersed bodies (the constituent (B)) contained in the diluted solution were measured with a particle size analyzer (Microtrac MT3300) of a laser diffraction and scattering type manufactured by NIKKISO CO. LTD to obtain a median size (D50).

(2) Haze

Haze (%) of the laminate was measured according to the rules defined in JIS K7136 using a haze meter (Haze Meter NDH2000) manufactured by NIPPON DENSHOKU INDUSTRIES CO. LTD.

(3) Oxygen Permeability

Oxygen permeability (Unit: $cm^3(STP)/m^2 \cdot day \cdot MPa$) was measured using an oxygen permeability measurement device manufactured by Modern Control Company (OX-TRAN2/20). Specifically, the oxygen permeability was measured under the condition of a temperature of 30° C., a humidity of oxygen feed side of 70% RH, a humidity of carrier gas side of 70% RH, an oxygen pressure of 1 atm, and a carrier gas pressure of 1 atm.

Example 1

11.1 g of aqueous polyester resin (PESRESIN A-647GEX produced TAKAMATSU OIL & FAT CO. LTD, solid content 20 mass %) was dissolved in 49.2 g of water, followed by adding 1.7 g of aqueous dispersion type polyisocyanate (produced by Asahi Kasei Chemicals Corporation, DURANATE WT30-100) and stirring. Subsequently, 38.0 g of 2-propanol was added and stirred, thereby obtaining an anchor coat agent 1.

Separately, 16.7 g of polyacrylic acid ammonium salt (TOAGOSEI CO., LTD, ARON A-30, solid content 30 mass %) having a weight-average molecular weight of 100000 was diluted in 62.5 g of water, followed by adding 18.5 g of 2-propanol and stirring. Thereafter, 2.3 g of zinc oxide (produced by SAKAI CHEMICAL INDUSTRY CO., LTD, FINEX-30) having a primary particle size of 35 nm was added and stirred. The obtained solution was subjected to dispersion treatment with a planetary ball mill (manufactured by FRITSCH, P-7) using zirconia beads having a diameter of 0.3 mm for two hours, followed by sifting out the beads, thereby obtaining a coating solution 1.

Mean particle size of the constituent (B) contained in the coating solution was measured according to the above-described procedure. The result is shown in Table 1.

Regarding polyacrylic acid ammonium salt used in Examples, its aqueous solution of a solid content of 10 mass % was 8.2 in pH (25° C.).

In the coating solution 1, zinc content was 1.0 time the chemical equivalent of polyacrylic acid ammonium salt. The pH of the coating solution 1 was 8.7.

Next, as the substrate, a biaxially-stretched polyethylene terephthalate film (TORAY INDUSTRIES, INC., LUMIRROR P-60, Thickness 12 μm) where one surface was subjected to corona treatment was prepared. The anchor coat agent 1 was applied on the corona-treated surface of the substrate by coating using a Meyer bar (K303 bar manufactured by RK Print-Coat Instruments) such that the coating amount after drying was 0.2 g/m$^2$, followed by drying with an oven at 100° C. for 30 seconds, thereby forming the anchor coat layer.

Subsequently, on the above-described anchor coat layer, the coating solution 1 was applied by coating using a Meyer bar such that the coating amount after drying was 0.5 g/m$^2$, and dried with an oven at 100° C. for 30 seconds to form the coat layer, thereby obtaining a laminate 1.

Mean particle size of the constituent (B) contained in the coating solution 1, haze and oxygen permeability of the obtained laminate 1 were measured according to the above-described procedure. The results are shown in Table 1.

Next, on the surface of the coat layer side of the laminate 1, a biaxially-stretched nylon film (produced by UNITIKA LTD., ONUM, Thickness 15 μm) was layered by dry lamination through a two-liquid type polyurethane-based adhesive agent (produced by Mitsui Chemical Polyurethane, Inc., TAKELAC A525/TAKENATE A52).

Further, a biaxially-stretched nylon film and unstretched polypropylene film (produced by TORAY ADVANCED FILM CO., LTD, ZK-93FM, Thickness 60 μm) were layered by dry lamination through the same polyurethane-based adhesive agent as the above, and subjected to aging at 40° C. for three days, thereby obtaining a laminate film.

Regarding the obtained laminate film, the following evaluation was performed. The results are shown in Table 1.
[Oxygen Permeability after Retort Treatment]

The obtained laminate film was cut into two sheets having a size of 20 cm*15 cm, three sides were sealed in a state where the unstretched polypropylene film surfaces were overlapped with each other, thereby preparing a pouch. After 200 mL of water was put into the pouch, the remaining one side was sealed.

The obtained pouch filled with water was subjected to retort treatment at 121° C. for 30 minutes using a retort treatment machine (RCS-60) manufactured by HISAKA WORKS, LTD.

After the retort treatment, water was removed, and oxygen permeability of the laminate film was measured according to the above-described procedure.
[Peel Strength]

Regarding the laminate film after the above-described retort treatment and the laminate film before the retort treatment, respectively, peel strength (N/15 mm) was measured using a universal material testing machine (TENSILON RC-1210A) manufactured by ORIENTEC Co., LTD by peeling the substrate and the biaxially-stretched nylon film from each other. The testing method was compliant with JIS K6854-3, and the measurement was performed under the condition where the width of a test piece was 15 mm and peeling speed was 300 mm/min.

Example 2

16.7 g of polyacrylic acid ammonium salt (TOAGOSEI CO., LTD, ARON A-30, solid content 30 mass %) having a weight-average molecular weight of 100000 was dissolved in 63.6 g of water, followed by adding 18.8 g of 2-propanol and stirring. Thereafter, 0.9 g of magnesium oxide (produced by SAKAI CHEMICAL INDUSTRY CO., LTD, SMO) having a primary particle size of 100 nm was added and stirred. The obtained solution was subjected to dispersion treatment with a planetary ball mill (manufactured by FRITSCH, P-7) using zirconia beads having a diameter of 0.3 mm for two hours, followed by sifting out the beads, thereby obtaining a coating solution 2.

Mean particle size of the constituent (B) contained in the coating solution 2 was measured according to the above-described procedure. The result is shown in Table 1.

In the coating solution 2, magnesium oxide content was 0.8 times the chemical equivalent of poly acrylic acid ammonium salt. The pH of the coating solution 2 was 8.5.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 2 in place of the coating solution 1, thereby obtaining a laminate 2. Haze and oxygen permeability of the obtained laminate 2 were measured according to the above-described procedure. The results are shown in Table 1.

Next, a laminate film was obtained in the same manner as Example 1 except for using the obtained laminate 2 in place of the laminate 1. Regarding the obtained laminate film, in the same way as Example 1, oxygen permeability and peel strength were evaluated after the retort treatment. The results are shown in Table 1.

Example 3

16.7 g of polyacrylic acid ammonium salt (TOAGOSEI CO., LTD, ARON A-30, solid content 30 mass %) having a weight-average molecular weight of 100000 was dissolved in 62.1 g of water, followed by adding 18.5 g of 2-propanol and stirring. Thereafter, 2.7 g of zinc oxide (produced by SAKAI CHEMICAL INDUSTRY CO., LTD, FINEX-30) having a primary particle size of 35 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 3.

Mean particle size of the constituent (B) contained in the coating solution 3 was measured according to the above-described procedure. The result is shown in Table 1.

In the coating solution 3, zinc oxide content was 1.2 time the chemical equivalent of polyacrylic acid ammonium salt. The pH of the coating solution 3 was 8.8.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 3 in place of the coating solution 1, thereby obtaining a laminate 3. Haze and oxygen permeability of the obtained laminate 3 were measured according to the above-described procedure. The results are shown in Table 1.

Next, a laminate film was obtained in the same manner as Example 1 except for using the obtained laminate 3 in place of the laminate 1. Regarding the obtained laminate film, as the same as Example 1, oxygen permeability and peel strength were evaluated after the retort treatment. The results are shown in Table 1.

Example 4

16.7 g of polyacrylic acid ammonium salt (TOAGOSEI CO., LTD, ARON A-30, solid content 30 mass %) having a weight-average molecular weight of 100000 was dissolved in 62.5 g of water, followed by adding 18.5 g of 2-propanol and stirring. Thereafter, 2.3 g of zinc oxide (produced by SAKAI CHEMICAL INDUSTRY CO., LTD, FINEX-30) having a primary particle size of 35 nm was added and stirred. The obtained solution was objected to a dispersion treatment with a planetary ball mill (manufactured by FRITSCH, P-7) using zirconia beads having a diameter of 0.3 mm for 30 minutes, followed by sifting out the beads, thereby obtaining a coating solution 4.

Mean particle size of the constituent (B) contained in the coating solution 4 was measured according to the above-described procedure. The result is shown in Table 1.

In the coating solution 2, zinc oxide content was 1.0 time the chemical equivalent of polyacrylic acid ammonium salt. The pH of the coating solution 4 was 8.7.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 4 in place of the coating solution 1, thereby obtaining a laminate 4. Haze and oxygen permeability of the obtained laminate 4 were measured according to the above-described procedure. The results are shown in Table 1.

Next, a laminate film was obtained in the same manner as Example 1 except for using the obtained laminate 4 in place of the laminate 1. Regarding the obtained laminate film, as the same as Example 1, oxygen permeability and peel strength were evaluated after the retort treatment. The results are shown in Table 1.

Example 5

16.7 g of polyacrylic acid ammonium salt (TOAGOSEI CO., LTD, ARON A-30, solid content 30 mass %) having a weight-average molecular weight of 100000 was dissolved in 62.5 g of water, followed by adding 18.5 g of 2-propanol and stirring. Thereafter, 2.3 g of zinc oxide (produced by SAKAI CHEMICAL INDUSTRY CO., LTD, FINEX-50) having a primary particle size of 20 nm was added and stirred. The obtained solution was objected to a dispersion treatment with a planetary ball mill (manufactured by FRITSCH, P-7) using zirconia beads having a diameter of 0.3 mm for five hours, followed by sifting out the beads, thereby obtaining a coating solution 5.

Mean particle size of the constituent (B) contained in the coating solution 5 was measured according to the above-described procedure. The result is shown in Table 1.

In the coating solution 5, zinc oxide content was 1.0 time the chemical equivalent of polyacrylic acid ammonium salt. The pH of the coating solution 5 was 8.7.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 5 in place of the coating solution 1, thereby obtaining a laminate 5. Haze and oxygen permeability of the obtained laminate 5 were measured according to the above-described procedure. The results are shown in Table 1.

Next, a laminate film was obtained in the same manner as Example 1 except for using the obtained laminate 5 in place of the laminate 1. Regarding the obtained laminate film, as the same as Example 1, oxygen permeability and peel strength were evaluated after the retort treatment. The results are shown in Table 1.

Example 6

16.7 g of polyacrylic acid ammonium salt (TOAGOSEI CO., LTD, ARON A-30, solid content 30 mass %) having a weight-average molecular weight of 100000 was dissolved in 63.0 g of water, followed by adding 18.7 g of 2-propanol and stirring. Thereafter, 1.6 g of magnesium hydroxide (Produced by Tateho Chemical Industries Co., Ltd, ECO-MAG Z-10) having a primary particle size of 1.0 μm was added and stirred. The obtained solution was objected to dispersion treatment with a planetary ball mill (manufactured by FRITSCH, P-7) using zirconia beads having a diameter of 0.3 mm for two hours, followed by sifting out the beads, thereby obtaining a coating solution 6.

Mean particle size of the constituent (B) contained in the coating solution 6 was measured according to the above-described procedure. The result is shown in Table 1.

In the coating solution 6, magnesium hydroxide content was 1.0 time the chemical equivalent of polyacrylic acid ammonium salt. The pH of the coating solution 6 was 8.7.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 6 in place of the coating solution 1, thereby obtaining a laminate 6. Haze and oxygen permeability of the obtained laminate 6 were measured according to the above-described procedure. The results are shown in Table 1.

Next, a laminate film was obtained in the same manner as Example 1 except for using the obtained laminate 6 in place of the laminate 1. Regarding the obtained laminate film, as the same as Example 1, oxygen permeability and peel strength were evaluated after the retort treatment. The results are shown in Table 1.

Example 7

16.7 g of polyacrylic acid ammonium salt (TOAGOSEI CO., LTD, ARON A-30, solid content 30 mass %) having a weight-average molecular weight of 100000 was dissolved in 62.1 g of water, followed by adding 18.4 g of 2-propanol and stirring. Thereafter, 2.8 g of calcium carbonate (produced by SHIRAISHI CALCIUM KAISYA, LTD, HAKUE-NKA PZ) having a primary particle size of 80 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 7.

Mean particle size of the constituent (B) contained in the coating solution 7 was measured according to the above-described procedure. The result is shown in Table 1.

In the coating solution 7, calcium carbonate content was 1.0 time the chemical equivalent of polyacrylic acid ammonium salt. The pH of the coating solution 7 was 8.8.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 7 in place of the coating solution 1, thereby obtaining a laminate 7. Haze and oxygen permeability of the obtained laminate 7 were measured according to the above-described procedure. The results are shown in Table 1.

Next, a laminate film was obtained in the same manner as Example 1 except for using the obtained laminate 7 in place of the laminate 1. Regarding the obtained laminate film, as the same as Example 1, oxygen permeability and peel strength were evaluated after the retort treatment. The results are shown in Table 1.

Example 8

16.7 g of polyacrylic acid ammonium salt (TOAGOSEI CO., LTD, ARON A-30, solid content 30 mass %) having a weight-average molecular weight of 100000 was dissolved in 62.5 g of water, followed by adding 18.5 g of 2-propanol and stirring. Thereafter, 2.3 g of plate-like zinc oxide (produced by SAKAI CHEMICAL INDUSTRY CO., LTD, XZ-100F) having a primary particle size of 100 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 8.

Mean particle size of the constituent (B) contained in the coating solution 8 was measured according to the above-described procedure. The result is shown in Table 1.

In the coating solution 8, zinc oxide content was 1.0 time the chemical equivalent of polyacrylic acid ammonium salt. The pH of the coating solution 8 was 8.7.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 8 in place of the coating solution 1, thereby obtaining a laminate 8. Haze and oxygen permeability of the obtained laminate 8 were measured according to the above-described procedure. The results are shown in Table 1.

Next, a laminate film was obtained in the same manner as Example 1 except for using the obtained laminate 8 in place of the laminate 1. Regarding the obtained laminate film, as the same as Example 1, oxygen permeability and peel strength were evaluated after the retort treatment. The results are shown in Table 1.

Example 9

16.7 g of polyacrylic acid ammonium salt (TOAGOSEI CO., LTD, ARON A-30, solid content 30 mass %) having a weight-average molecular weight of 100000 was dissolved in 63.4 g of water, followed by adding 18.8 g of 2-propanol and stirring. Thereafter, 1.1 g of zinc oxide (produced by SAKAI CHEMICAL INDUSTRY CO., LTD, FINEX30) having a primary particle size of 35 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 9.

Mean particle size of the constituent (B) contained in the coating solution 9 was measured according to the above-described procedure. The result is shown in Table 1.

In the coating solution 9, zinc oxide content was 0.5 time the chemical equivalent of polyacrylic acid ammonium salt. The pH of the coating solution 9 was 8.4.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 9 in place of the coating solution 1, thereby obtaining a laminate 9. Haze and oxygen permeability of the obtained laminate 9 were measured according to the above-described procedure. The results are shown in Table 1.

Next, a laminate film was obtained in the same manner as Example 1 except for using the obtained laminate 9 in place of the laminate 1. Regarding the obtained laminate film, as the same as Example 1, oxygen permeability and peel strength were evaluated after the retort treatment. The results are shown in Table 1.

Example 10

16.7 g of polyacrylic acid ammonium salt (TOAGOSEI CO., LTD, ARON A-30, solid content 30 mass %) having a weight-average molecular weight of 100000 was dissolved in 60.7 g of water, followed by adding 18.1 g of 2-propanol and stirring. Thereafter, 4.6 g of zinc oxide (produced by SAKAI CHEMICAL INDUSTRY CO., LTD, FINEX) having a primary particle size of 35 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 10.

Mean particle size of the constituent (B) contained in the coating solution 10 was measured according to the above-described procedure. The result is shown in Table 1.

In the coating solution 10, zinc oxide content was 2.0 time the chemical equivalent of polyacrylic acid ammonium salt. The pH of the coating solution 10 was 8.9.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 10 in place of the coating solution 1, thereby obtaining a laminate 10. Haze and oxygen permeability of the obtained laminate 10 were measured according to the above-described procedure. The results are shown in Table 1.

Next, a laminate film was obtained in the same manner as Example 1 except for using the obtained laminate 10 in place of the laminate 1. Regarding the obtained laminate film, as the same as Example 1, oxygen permeability and peel strength were evaluated after the retort treatment. The results are shown in Table 1.

Comparative Example 1

16.7 g of polyacrylic acid ammonium salt (TOAGOSEI CO., LTD, ARON A-30, solid content 30 mass %) having a weight-average molecular weight of 100000 was dissolved in 64.3 g of water, followed by adding 19.0 g of 2-propanol and stirring, thereby obtaining the coating solution 11.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 11 in place of the coating solution 1, thereby obtaining a laminate 11. Haze and oxygen permeability of the obtained laminate 11 were measured according to the above-described procedure. The results are shown in Table 1.

Next, a laminate film was obtained in the same manner as Example 1 except for using the obtained laminate 11 in place of the laminate 1. Regarding the obtained laminate film, in the same way as Example 1, oxygen permeability and peel strength were evaluated after the retort treatment. The results are shown in Table 1.

Comparative Example 2

20.0 g of polyacrylic acid (TOAGOSEI CO., LTD, ARON A-10H, solid content 25 mass %) having a weight-average molecular weight of 200000 was dissolved in 59.4 g of water, followed by adding 18.3 g of 2-propanol and stirring. Thus, a coating solution was intended to be obtained, which resulted in a precipitate during stirring, and a uniform liquid could not be obtained. Accordingly, a laminate was not prepared.

Comparative Example 3

11.9 g of polyacrylic acid sodium salt (TOAGOSEI CO., LTD, ARON A-20UN, solid content 42 mass %) having a weight-average molecular weight of 100000 was dissolved in 67.6 g of water, followed by adding 19.0 g of 2-propanol and stirring. Thereafter, 1.6 g of zinc oxide (produced by SAKAI CHEMICAL INDUSTRY CO., LTD, FINEX-30) having a primary particle size of 35 nm was added and stirred. The obtained solution was subjected to a dispersion treatment with a planetary ball mill (manufactured by FRITSCH, P-7) using zirconia beads having a diameter of 0.3 mm for two hours, followed by sifting out the beads, thereby obtaining a coating solution 13.

Mean particle size of the constituent (B) contained in the coating solution 13 was measured according to the above-described procedure. The result is shown in Table 1.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 13 in place of the coating solution 1, thereby obtaining a laminate 13. Haze and oxygen permeability of the obtained laminate 13 were measured according to the above-described procedure. The results are shown in Table 1.

Next, a laminate film was obtained in the same manner as Example 1 except for using the obtained laminate 13 in place of the laminate 1. Regarding the obtained laminate film, in the same way as Example 1, oxygen permeability and peel strength were evaluated after the retort treatment. The results are shown in Table 1.

Comparative Example 4

16.7 g of polyacrylic acid ammonium salt (TOAGOSEI CO., LTD, ARON A-30, solid content 30 mass %) having a weight-average molecular weight of 100000 was dissolved in 64.0 g of water, followed by adding 18.9 g of 2-propanol and stirring. Thereafter, 0.5 g of zinc oxide (produced by SAKAI CHEMICAL INDUSTRY CO., LTD, FINEX-30) having a primary particle size of 35 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 14.

Mean particle size of the constituent (B) contained in the coating solution 14 was measured according to the above-described procedure. The result is shown in Table 1.

In the coating solution 14, zinc oxide content was 0.2 time the chemical equivalent of polyacrylic acid ammonium salt. The pH of the coating solution 14 was 8.2.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 14 in place of the coating solution 1, thereby obtaining a laminate 14. Haze and oxygen permeability of the obtained laminate 14 were measured according to the above-described procedure. The results are shown in Table 1.

Next, a laminate film was obtained in the same manner as Example 1 except for using the obtained laminate 14 in place of the laminate 1. Regarding the obtained laminate film, as the same as Example 1, oxygen permeability after the retort treatment and peel strength were evaluated. The results are shown in Table 1.

Comparative Example 5

16.7 g of polyacrylic acid ammonium salt (TOAGOSEI CO., LTD, ARON A-30, solid content 30 mass %) having a weight-average molecular weight of 100000 was dissolved in 57.0 g of water, followed by adding 17.2 g of 2-propanol and stirring. Thereafter, 9.2 g of zinc oxide (produced by SAKAI CHEMICAL INDUSTRY CO., LTD, FINEX-30) having a primary particle size of 35 nm was added and stirred. The obtained solution was objected to a dispersion treatment with a planetary ball mill (manufactured by FRITSCH, P-7) using zirconia beads having a diameter of 0.3 mm for two hours, followed by sifting out the beads, thereby obtaining a coating solution 15.

Mean particle size of the constituent (B) contained in the coating solution 15 was measured according to the above-described procedure. The result is shown in Table 1.

In the coating solution 15, zinc oxide content was 4.0 time the chemical equivalent of polyacrylic acid ammonium salt. The pH of the coating solution 15 was 9.6.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 15 in place of the coating solution 1, thereby obtaining a laminate 15. Haze and oxygen permeability of the obtained laminate 15 were measured according to the above-described procedure. The results are shown in Table 1.

Next, a laminate film was obtained in the same manner as Example 1 except for using the obtained laminate 15 in place of the laminate 1. Regarding the obtained laminate film, as the same as Example 1, oxygen permeability and peel strength were evaluated after the retort treatment. The results are shown in Table 1.

Comparative Example 6

16.7 g of polyacrylic acid ammonium salt (TOAGOSEI CO., LTD, ARON A-30, solid content 30 mass %) having a weight-average molecular weight of 100000 was dissolved in 62.5 g of water, followed by adding 18.5 g of 2-propanol and stirring. Thereafter, 2.3 g of zinc oxide (produced by Wako Pure Chemical Industries, Ltd., Wako 1$^{st}$ Grade) was added and stirred, thereby obtaining a coating solution 16.

Mean particle size of the constituent (B) contained in the coating solution 16 was measured according to the above-described procedure. The result is shown in Table 1.

In the coating solution 16, zinc oxide content was 1.0 time the chemical equivalent of poly acrylic acid ammonium salt. The pH of the coating solution 16 was 8.6.

Next, in the same manner as Example 1, the anchor coat layer was provided on the substrate (biaxially-stretched polyethylene terephthalate film). Subsequently, on the anchor coat layer, the coat layer was formed in the same manner as Example 1 except for using the coating solution 16 in place of the coating solution 1, thereby obtaining a laminate 16. Haze and oxygen permeability of the obtained laminate 16 were measured according to the above-described procedure. The results are shown in Table 1.

Next, a laminate film was obtained in the same manner as Example 1 except for using the obtained laminate 16 in place of the laminate 1. Regarding the obtained laminate film, as the same as Example 1, oxygen permeability and peel strength were evaluated after the retort treatment. The results are shown in Table 1.

In table 1, B/A shows the ratio of the constituent (B) content to the chemical equivalent of the constituent (A).

As shown in the above-described results, in Examples 1 to 10, the obtained laminates had high barrier properties of oxygen permeability of 100 cm$^3$(STP)/m$^2$·day·MPa or less even under a high-humidity atmosphere of a humidity of 70% RH. In each laminate film obtained using a respective laminate, the oxygen permeability was improved after the retort treatment. Also, peel strength between the substrates was increased, and the interlayer adhesiveness increased. Further, in Examples 1 to 3 and 7 to 10 whose mean particle sizes were 1.0 µm or less, hazes of the laminates were small, and transparencies were high.

On the other hand, in Comparative Example 1 using the coating solution which did not contain the constituent (B), the oxygen permeability was large. The peel strength (especially, after the retort treatment) was small.

In Comparative Example 2 using polyacrylic acid in place of the constituent (A), the coating solution could not be prepared well.

In Comparative Example 3 using sodium polyacrylate in place of the constituent (A), the oxygen permeability was large. The peel strength (especially, after the retort treatment) was small.

In Comparative Example 4 using the coating solution where the constituent (B) content was under 0.5 times the chemical equivalent of the constituent (A), the oxygen permeability (especially, after the retort treatment) was large, compared to Examples 1 to 10.

In Comparative Example 5 using the coating solution where the constituent (B) content was over 2.0 times the chemical equivalent of the constituent (A), the oxygen permeability was large.

In Comparative Example 6 using the coating solution where mean particles size of the constituent (B) was 5 µm, haze and the oxygen permeability were large.

TABLE 1

| | B/A | pH of Coating Solution | Mean Particle Size (µm) | Haze (%) | Oxygen Permeability (cm3(STP)/m2 · day · MPa) | | Peel Strength (N/15 mm) | |
| | | | | | Laminate | Laminate Film After Retort Treatment | Before Retort Treatment | After Retort Treatment |
|---|---|---|---|---|---|---|---|---|
| Example 1 | 1.0 | 8.7 | 0.2 | 4.0 | 12 | 3 | 2.5 | 4.5 |
| Example 2 | 0.8 | 8.5 | 0.9 | 6.0 | 50 | 15 | 2.8 | 4.4 |
| Example 3 | 1.2 | 8.8 | 0.5 | 5.2 | 15 | 5 | 2.3 | 4.3 |
| Example 4 | 1.0 | 8.7 | 3.0 | 22.1 | 82 | 30 | 2.3 | 4.0 |
| Example 5 | 1.0 | 8.7 | 0.07 | 2.8 | 9 | 2 | 3.0 | 4.8 |
| Example 6 | 1.0 | 8.7 | 3.0 | 37.5 | 95 | 80 | 2.3 | 4.2 |
| Example 7 | 1.0 | 8.8 | 1.0 | 19.4 | 74 | 43 | 2.8 | 4.3 |
| Example 8 | 1.0 | 8.7 | 1.0 | 5.1 | 22 | 8 | 2.2 | 4.0 |
| Example 9 | 0.5 | 8.4 | 0.1 | 3.5 | 97 | 72 | 2.7 | 3.9 |
| Example 10 | 2.0 | 8.9 | 0.9 | 6.5 | 63 | 42 | 2.2 | 4.1 |
| Comparative Example 1 | — | — | — | 3.2 | 900 | 900 | 2.0 | 1.1 |
| Comparative Example 2 | — | Laminate was not prepared because of settling during preparation of coating solution | | | | | | |
| Comparative Example 3 | — | — | 0.2 | 3.8 | 900 | 900 | 2.0 | 1.0 |
| Comparative Example 4 | 0.2 | 8.2 | 0.1 | 3.0 | 110 | 250 | 2.7 | 3.0 |
| Comparative Example 5 | 4.0 | 9.6 | 1.8 | 12.0 | 150 | 100 | 2.0 | 3.2 |
| Comparative Example 6 | 1.0 | 8.6 | 5.0 | 52.4 | 200 | 120 | 2.0 | 4.0 |

The invention being thus described, it will be clear that the same may be varied in many ways. Such variations are not to be regarded as a departure from the spirit and scope of the invention and all such modifications as would be clear to one skilled in the art are intended to be included within the scope of the following claims.

What is claimed is:

1. A method of preparing a coating solution for a gas barrier, consisting of:
    preparing a mixture consisting of an ammonium salt of a polymer that includes carboxylic groups (A), a particulate multivalent metallic compound (B) and a solvent that consists of water and an alcohol, wherein an amount of the particulate multivalent metallic compound in the mixture is 0.5 times to 2.0 times the chemical equivalent of the ammonium salt of the polymer (A); and
    performing a dispersion treatment of the prepared mixture so that after the treatment a mean particle size of the multivalent metallic compound (B) is 4 μm or less and 50 nm or more to form the coating solution.

2. The method of claim 1, wherein the dispersion treatment is performed using a ball mill or a bead mill having a diameter of treatment balls or beads of 0.2 to 1 mm.

3. The method of claim 1, wherein the multivalent metallic compound (B) is at least one selected from the group consisting of an oxide, hydroxide and carbonate of a multivalent metal selected from the group consisting of zinc, magnesium and calcium.

4. The method of claim 1, wherein the multivalent metallic compound (B) is at least one selected from the group consisting of zinc oxide and magnesium oxide.

5. The method of claim 1, wherein the polymer including a carboxyl group is polyacrylic acid.

6. The method of claim 1, wherein the multivalent metallic compound has a solubility of 5.0 g or less at 25° C. in 1 L of water and the ammonium salt (A) is 1.5 mass % to 10 mass % relative to a gross mass of the coating solution, and a pH of the coating solution is 6.5-9.5 at 25° C.

7. A method of producing a gas barrier laminate comprising a substrate and a gas barrier layer provided on at least one surface of the substrate,
    wherein the gas barrier layer includes a coat layer, wherein the method consists of: preparing a mixture consisting of an ammonium salt of a polymer that includes carboxylic groups (A), a particulate multivalent metallic compound (B) and a solvent that consists of water and an alcohol, wherein an amount of the particulate multivalent metallic compound in the mixture is 0.5 times to 2.0 times the chemical equivalent of the ammonium salt of the polymer (A);
    performing a dispersion treatment of the prepared mixture so that after the treatment a mean particle size of the multivalent metallic compound (B) is 4 μm or less and 50 nm or more to form a coating solution;
    and forming the coat layer by applying the coating solution on the substrate and then drying.

8. The method of claim 7, wherein the drying is performed at a temperature of 40 to 150° C. in an oven.

9. The method of claim 8, wherein the drying is performed for 0.5 seconds to 10 minutes.

10. The method of claim 7, wherein the drying is performed for 0.5 seconds to 10 minutes.

* * * * *